United States Patent [19]
Harrington

[11] Patent Number: 5,317,650
[45] Date of Patent: May 31, 1994

[54] DETERMINATION OF THE ARC LENGTH OF A CURVE

[75] Inventor: Steven J. Harrington, Holley, N.Y.

[73] Assignee: Xerox Corporation, Stamford, Conn.

[21] Appl. No.: 33,563

[22] Filed: Mar. 23, 1993

Related U.S. Application Data

[63] Continuation-in-part of Ser. No. 736,998, Jul. 29, 1991, abandoned.

[51] Int. Cl.⁵ .............................................. G06K 9/00
[52] U.S. Cl. ...................................... 382/22; 382/28; 382/60; 395/142
[58] Field of Search ....................... 382/13, 29, 22, 28, 382/60; 364/564; 345/16; 395/142, 143

[56] References Cited

U.S. PATENT DOCUMENTS

| | | | |
|---|---|---|---|
| 4,156,231 | 5/1979 | Edamatsu et al. | 382/22 |
| 4,550,504 | 11/1985 | Mehnert | 364/562 |

Primary Examiner—Leo H. Boudreau
Attorney, Agent, or Firm—Oliff & Berridge

[57] ABSTRACT

The determination of the arc length of a curve incorporated into an imaging system in the production of images includes the determination of a sequence of steps of movement along the curve on a pixel grid in one direction. A terminating step along the curve in another direction neighboring the one direction is determined. The accumulated length of the sequence of steps is determined. A correction amount corresponding to the contribution of the terminating step is added to the accumulated length to yield a line segment length corresponding to the arc length.

13 Claims, 8 Drawing Sheets

26
LENGTH OF SEQUENCE

DETERMINATION OF THE ARC LENGTH OF A CURVE

This is a continuation-in-part of application Ser. No. 07/736,998, filed Jul. 29, 1991, now abandoned.

BACKGROUND OF THE INVENTION

1. Field of the Invention

The present invention relates to the determination of the arc length of a curve and, more particularly, to the determination of the arc length of a curve incorporated into an imaging system.

2. Description of the Related Art

The determination of the arc length of a curve is a necessary determination in many computer-aided-design and computer-graphics applications. For example, when patterns are positioned along a curve, the arc length of the curve must be determined. The construction of dashed lines is a common application since arc lengths are commonly used to determine when to start and stop a dash. Page-description languages such as Interpress and Post-Script allow a user to set arbitrary-patterns for lines and curves, thus making the determination of arc length a requirement for the imaging system.

The length of a line having any orientation is given by the well-known expression, $$l = \sqrt{x^2 + y^2} \tag{1}$$

where l is the length of the line, x is the projection of the line on the x-axis, i.e., the difference of the x coordinates of the end points of the line, and y is the projection of the line on the y-axis, i.e., the difference of the y-coordinates of the end points of the line.

The length of a circular arc is given by the well-known expression $$l = r a \tag{2}$$

where l is the length of the arc, r is the radius of the arc and a is the angle of the arc in radians.

In accordance with the above-expressions, simple algebraic formulas are available for determinations of the arc length of lines and circular arcs. However, there is no simple algebraic formula for the arc length of more general curves such as arbitrary conics and cubics. In the case of such general curves, the structure of the curve is commonly segmented into small sections. Each section is then approximated by a line, and equation (1) is applied to yield an approximate length. The approximated lengths for all of the segments are added to yield the approximate length of the curve.

The above-described segmentation and length approximation requires knowledge of the precise manner in which the curve is to be subdivided. The ability and ease of the subdivision varies in accordance with the particular type of curve whose length is being approximated. In addition, in view of the necessity of subdividing the curve and calculating the square root of the sum of the squares of the line projections on the x and y axes, significant cost is incurred in determining the arc lengths. Further, the approximated arc length is determined only at the subdivision point.

Figure 1:
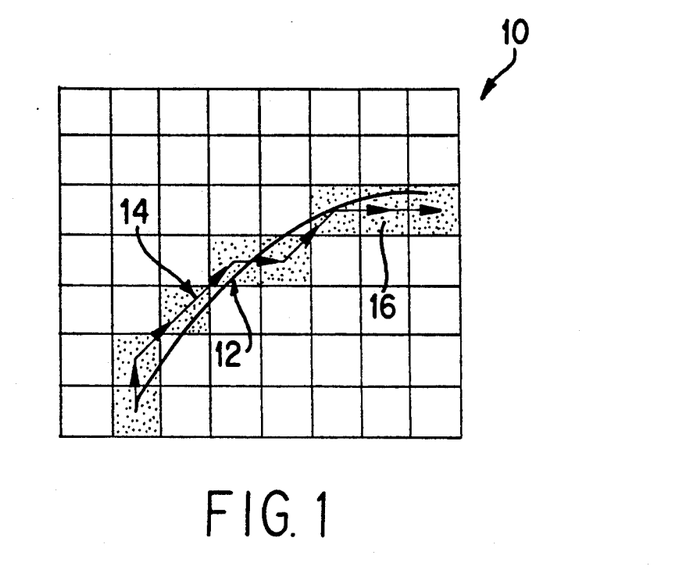
FIG. 1 is a diagram of a known technique for the determination of the arc length of a curve.

One technique has been proposed to determine the approximate arc length of a curve. The technique calculates the approximate arc length during the curve generation and rendering process. For example, in computer graphics, curves are rendered as a set of pixels on a grid. Pixels which are intersected by the ideal curve are illuminated or inked. Various curve generation algorithms have been developed for determining which pixels should be selected as one moves along the ideal curve. A sequence of corresponding moves along the pixel grid results. FIG. 1 provides an illustration of a pixel grid 10 having an ideal curve 12 located thereon. A sequence of corresponding moves 14 along the pixel grid 10 are illustrated. The illuminated pixels determined to be selected during movement along curve 12 are shown by reference numeral 16.

Figure 2:
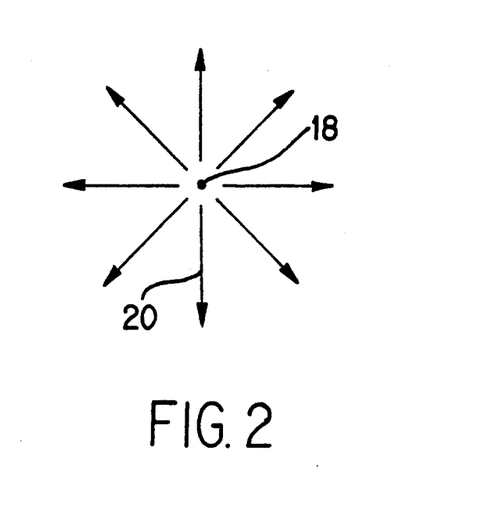
FIG. 2 is an illustration of the possible directions of movement for a step according to the technique of FIG. 1.

In order to generate a continuous curve using the above-described technique, each step along the pixel grid 10 is limited to one of the eight directions illustrated in FIG. 2, each of the directions corresponding to the eight immediate neighbors of an individual pixel. In FIG. 2, the pixel is illustrated by the central dot 18 while the eight directions are illustrated by arrows 20. The pixel/grid motions 14 for the curve 12 shown in FIG. 1 are generated and are used as straight-line approximations to the curve 12. If a step in the curve generation is left, right, up or down, one pixel width is added to the curve length as the step is taken. If, however, a diagonal step is taken, a value of 1.414, i.e., the square root of $1^2 + 1^2$, times the pixel width is added to the curve length.

The above-described technique automatically performs the subdivision of the curve, thus incurring no additional costs. Because only two possible segment lengths, i.e., one pixel width or 1.414 times the pixel width, can be precomputed, no square root calculations are required. The technique determines the arc length for each pixel step, the pixel step being as fine as one is able to draw.

Figure 3:
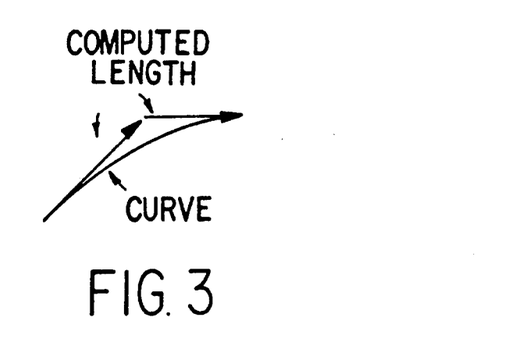
FIG. 3 is an illustration of the variation between an actual curve and the computed length of the curve according to the FIG. 1 technique.

One problem resulting from the above-described technique is that the accuracy of the determination is limited. The computed arc length is equal to the length of a sequence of horizontal, vertical and diagonal lines leading from the start point of the curve to the end point of the curve. FIG. 3 illustrates a reordering of the pixel steps 14 performed for the curve 12 so that all of the steps in a given direction are grouped together. As illustrated in FIG. 3, the computed length deviates significantly from the actual length of the curve.

OBJECTS AND SUMMARY OF THE INVENTION

An object of the present invention is to provide an imaging system which a determines arc length in the course of producing an image.

Another object of the present invention is to provide a determination of the arc length of a curve having improved accuracy.

Another object of the present invention is to provide an automatic determination of the arc length of a curve.

Another object of the present invention is to provide an inexpensive determination of the arc length of a curve.

A further object of the present invention is to provide a determination of the arc length of a curve without requiring subdivision of the curve.

To achieve the foregoing and other objects and to overcome the shortcomings discussed above, an imaging system is provided which utilizes page description languages such as Interpress and PostScript to produce an image. The imaging system includes a description interpretation apparatus and an image rasterizing device. After being rasterized, the image is transmitted through an image buffer for subsequent production of the image either by an image display apparatus or actual printing by a printing system.

The determination of the arc length of a curve is provided which includes the determination of a sequence of steps of movement along the curve on a pixel grid in one of various directions. A determination is made whether the sequence of steps in the one direction terminates in a step along the curve in another direction neighboring the one direction. If the sequence of steps does terminate in such a terminating step, a correction amount is added to the accumulated length of the sequence of steps, the correction amount corresponding to the contribution of the terminating step. The technique yields a line segment length corresponding closely to the arc length. The arc length determination can be incorporated into the rasterizing device to create a modified image, such as a dashed curve or a curved character string.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENTS

Figure 4:
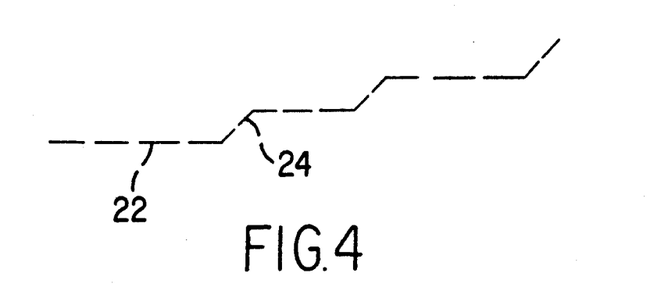
FIG. 4 illustrates a sequence of steps taken according to the present invention.

Referring now to the Figures, and more particularly to FIG. 4 thereof, the pattern of pixel steps for a smooth curve is illustrated. The pattern of pixel steps comprises a sequence of steps 22 in one direction followed by a step 24 in a direction neighboring the one direction. The pattern of pixel steps in this example include a plurality of step sequences 22, each step sequence followed by a step 24. According to the present invention, the arc length of a curve is determined by adding the lengths for the sequence of steps in the same direction. When the pattern of pixel steps includes a step in the neighboring direction 24 following a sequence of steps in the same direction, the length of the step 24 is not added. Rather, only a correction amount is added to the accumulated length of the sequence of steps in the same direction. The addition of the correction amount yields the length of a line connecting the starting point of the sequence of steps in the same direction and the end point of the neighboring step.

Figure 5:
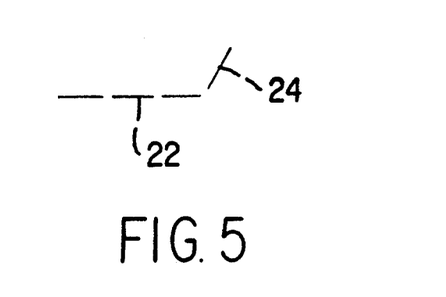
FIG. 5 illustrates a sequence of steps and a terminating step, taken according to the present invention.

FIG. 5 illustrates one sequence of three steps 22 followed by one diagonal step 24. According to the present invention, the length for the sequence of steps 22 in the horizontal direction is determined to be 3 assuming a pixel width of 1. The contribution from the diagonal step 24 is determined in accordance with the following equation:

$$\sqrt{(N+1)^2 + 1} - N \tag{3}$$

where N is the number of horizontal or vertical steps in a sequence, the sequence of N horizontal or vertical steps being followed by a neighboring diagonal step.

In the example of FIG. 5, using equation (3), the contribution from the diagonal is $$\sqrt{4^2 + 1} - 3$$

The contribution from diagonal step 24 is thus determined to be a value different from the actual length of step 24 (i.e., $\sqrt{1^2 + 1^2}$ in accordance with equation (1) above).

Figure 6:
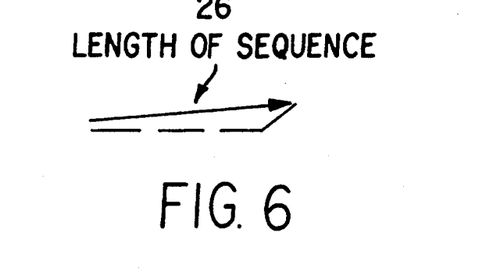
FIG. 6 illustrates the computed length of the sequence of the steps of FIG. 5 according to the present invention.

When the contribution from the diagonal step 24 is added to the accumulated length of the sequence of steps 22 in the horizontal direction, a length of the entire sequence 26 is obtained as illustrated in FIG. 6.

When the beginning sequence of steps in the same direction is a sequence of N diagonal steps followed by a neighboring horizontal or vertical step, the contribution from each diagonal step, assuming a pixel width of 1, is $\sqrt{1^2 + 1^2}$ as determined in accordance with equation (1) above. Accordingly, the accumulated length of a sequence of N diagonal steps would be N times the square root of 2. The contribution from the horizontal or vertical step following the sequence of N diagonal steps is determined in accordance with the following equation:

$$\sqrt{(N+1)^2 + N^2} - N\sqrt{2}$$

where N is the number of diagonal steps in the sequence.

The length of each sequence of steps and the contribution of the following step in a neighboring direction, i.e., the length of a line from the starting point of each sequence of steps in the same direction to an end point of the following step in a neighboring direction, are added to provide an accurate approximation of the arc length of an entire curve.

Figure 7:
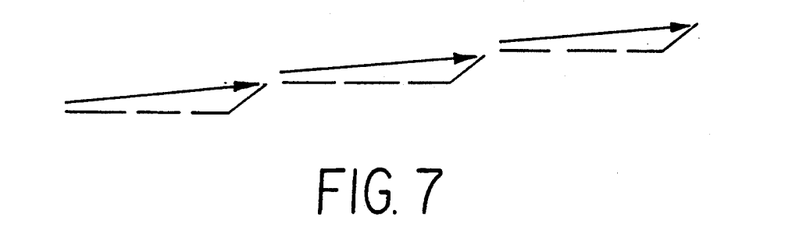
FIG. 7 illustrates the lengths of a run of sequences determined in accordance with the present invention.

FIG. 7 illustrates the length 26 of each of three such sequences of a curve. The lengths of the three line segments are added to determine the arc length of the curve.

Figure 8:
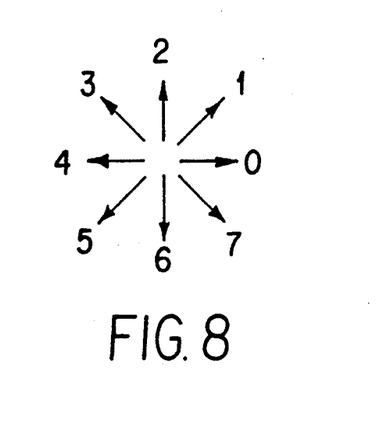
FIG. 8 illustrates a coding for the steps for the curve generation arc according to the present invention.

An algorithm expressed in the C programming language which can be used to compute approximate arc lengths as described above is set forth below. The algorithm assumes that the steps for the curve generation arc are coded as a number between 0 and 7 as illustrated in FIG. 8 and are obtained by calling a GetStep function. The algorithm further assumes that the curve generation arc is terminated by a negative step code.

```
float TableA[maxTableIndex + 1] = {1.414, 1.236, 1.162, 1.123, ..., 1.0};
float TableB[maxTableIndex + 1] = {1.0, 0.822, 0.778, 0.758, ..., 0.707};
float ArcLength( )
{int stepcode;
  float length = 0.0;
  int direction = 0;
  int count = 0;
  while ((stepcode = GetStep( )) > = 0)
  {if((stepcode = = (direction + 1)% 8) || (stepcode = = (direction + 7)%8))
    {if(count > maxTableIndex)
      count = maxTableIndex;
    if(stepcode %2 = = 1)
      length = length + TableA[count];
    else
      length = length + TableB[count];
    count = 0;
    }
    else
    {if(stepcode % 2 = =1)
      length = length + 1.414;
    else
      length = length + 1.0;
    if(stepcode = = direction)
      count = count + 1;
    else
      count = 1;
    }
    direction = stepcode;
  }
  return(length);
}
```

As described above, the contribution of the step in a neighboring direction which follows a sequence of steps in the same direction is calculated for each sequence. Alternatively, the contribution of the step may also be precalculated and stored in a table, thus requiring only the retrieval of the precalculated contribution and the addition of the precalculated contribution to the length of the steps in the same direction. Such a table could store a plurality of correction amounts, each correction amount corresponding to one of a plurality of numbers of steps in a sequence in the same direction. The appropriate correction amount can then be selected from the table in accordance with the number of steps in the sequence of steps in the same direction. For a sequence of steps longer than the size of the table, the asymptotic values of 1 for the diagonal step following a long sequence of horizontal or vertical steps and $1/\sqrt{2}$ for a horizontal or vertical step following a long sequence of diagonal steps can be used.

A table could also be used to store a plurality of line segment lengths 26, each line segment length being associated with one of a plurality of step sequences in the same direction. The line segment length in the table would reflect the length of steps in the same direction and the correction amount corresponding to the step in the neighboring direction. An appropriate line segment length can then be selected in accordance with a number of steps encountered in the same direction. This type of table requires only retrieval of the appropriate line segment length. Accordingly, no addition is required of the contribution of the step in a neighboring direction to the length of the sequence of steps in the same direction.

Figure 9:
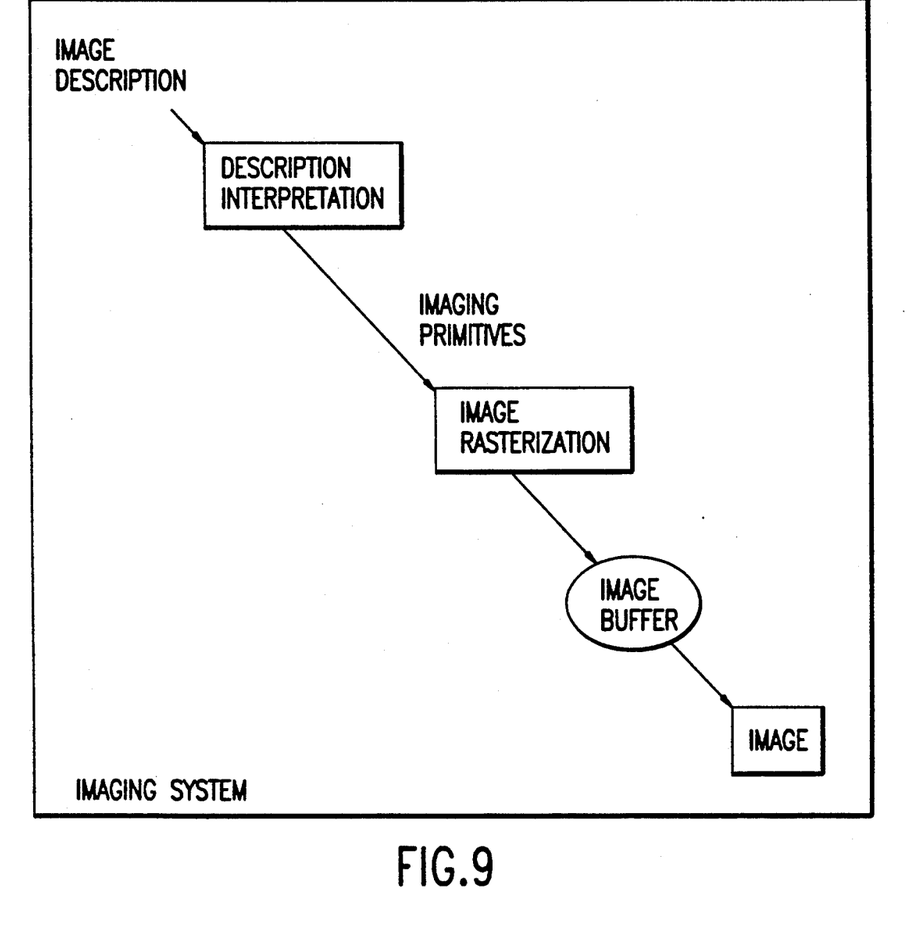
FIG. 9 is a schematic diagram of the imaging system.

Referring to FIGS. 9–13, a preferred imaging system will be described which incorporates the arc length determination in the production of images. Referring to FIG. 9, an image description contained in a page description language, such as PostScript, Interpress and the like, is received by a description interpretation apparatus whereupon the image description is rasterized through a known image rasterization process. The data is then transmitted through an image buffer for subsequent production by the imaging system. Such production can include either display on a standard graphics display device, such as a cathode ray tube or liquid crystal display, or printing on a printing substrate by, for example, a laser printer.

Figure 10:
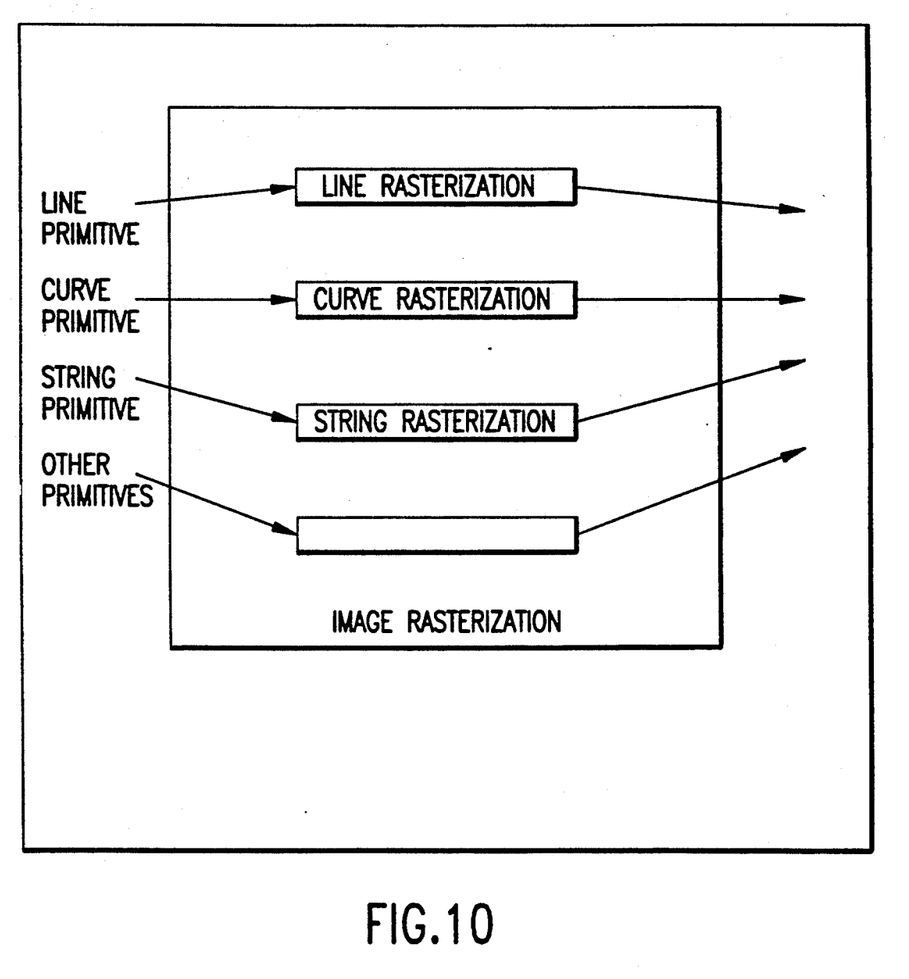
FIG. 10 is a more detailed schematic diagram of the rasterizing device.
Figure 11:
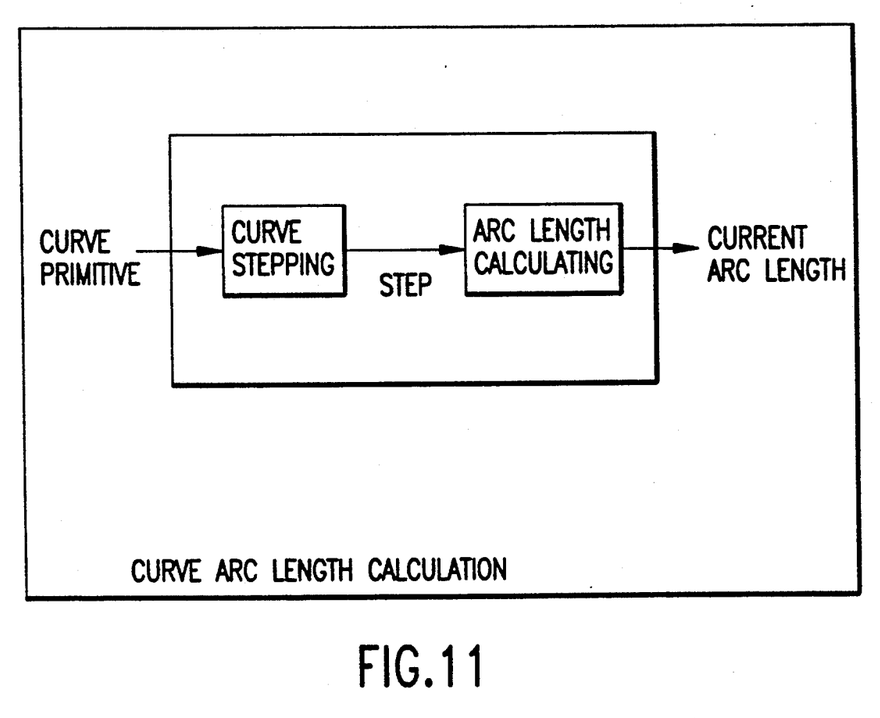
FIG. 11 represents the calculation of a current arc length from a curve primitive.

As illustrated in FIG. 10, the rasterization apparatus is divided into a plurality of sections including a line rasterization means, a curve rasterization means, a string rasterization means and any number of miscellaneous rasterization means for rasterizing other primitives. The line rasterization means rasterizes the image description containing non-curved line data. The curve rasterization means rasterizes the image description containing curve primitive data. The string rasterization means rasterizes character data.

Figure 12:
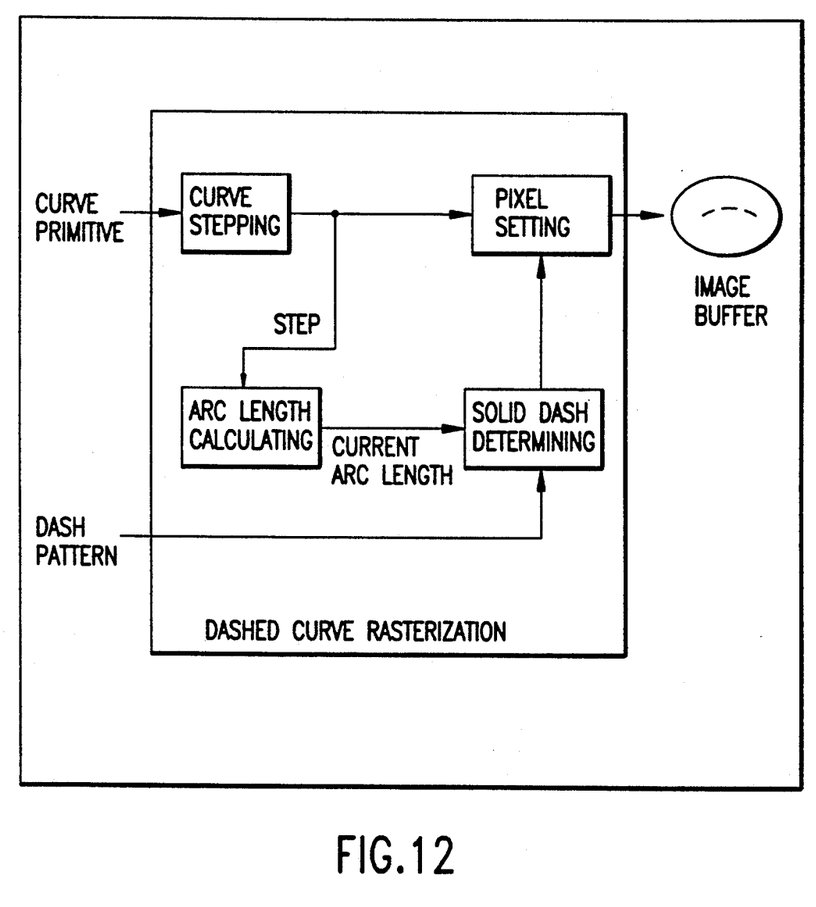
FIG. 12 is a schematic diagram of the creation of dashed curves with the arc length calculation.
Figure 13:
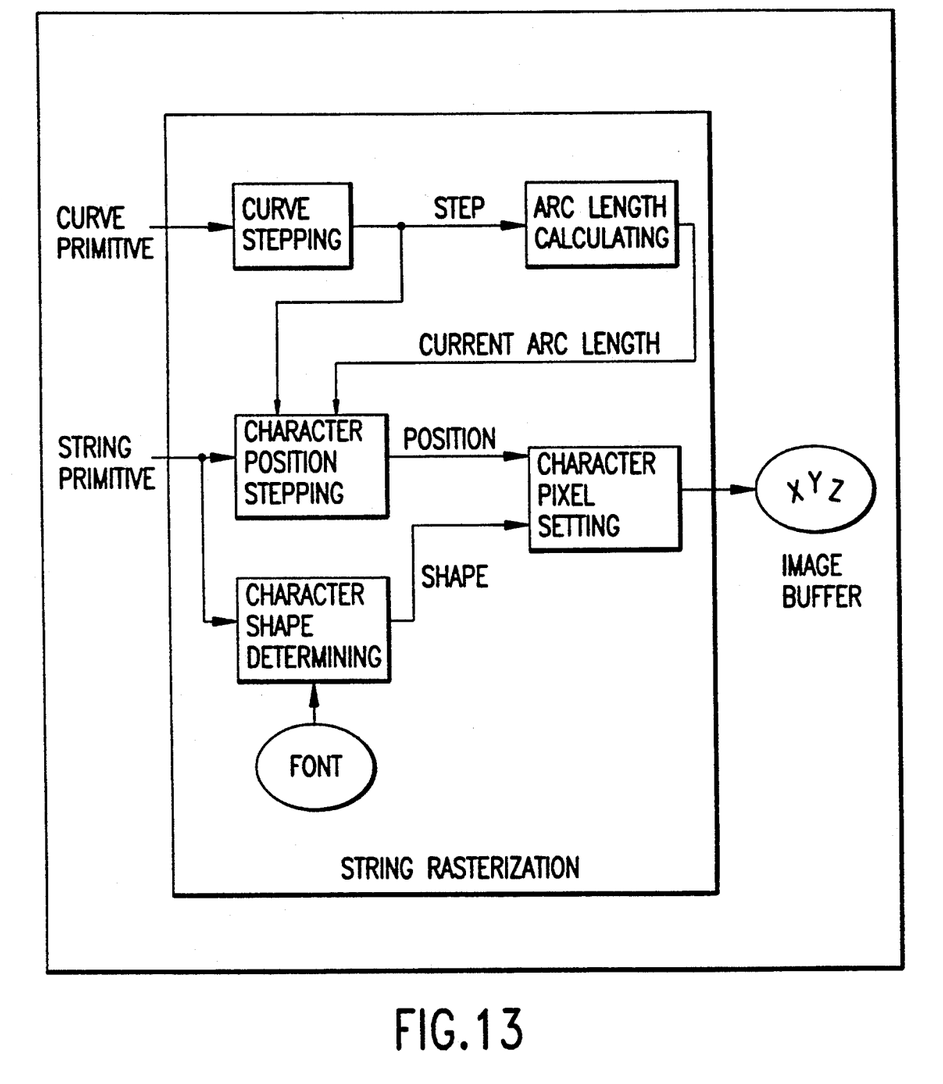
FIG. 13 is a schematic diagram of the positioning of a character string with the arc length calculation.

The arc length determination of the present invention is contained in the main rasterization apparatus and can be incorporated into any of the sub-rasterization means (see FIGS. 12 and 13). In the curve rasterization means (FIG. 11), an image description containing a curve primitive is input to a curve stepping means which outputs a stepped curve of the image. The arc length of the curve is determined as discussed above in connection with FIGS. 1–8. The imaging system incorporates the determination of arc length for producing images such as dashed curves (FIG. 12) or curved character strings (FIG. 13).

The above described imaging system is applicable to laser printers, high resolution graphic display systems, such as CAD systems, or any other imaging system capable of utilizing page description languages such as PostScript, Interpress and the like.

While this invention has been described in conjunction with specific embodiments thereof, it is evident that many alternatives, modifications and variations will be what is claimed is:

1. A method of producing an image with an imaging system, comprising the steps of:
   receiving an image description representative of an image to be produced;
   rasterizing said image description;
   determining arc length of a curve, said arc length being determined by the steps of:
      determining a sequence of steps of movement along the curve on a pixel grid in one of several predetermined directions;
      determining whether the sequence of steps terminates in a terminating step along the curve in another of said predetermined directions, said another direction neighboring said one direction; and
      if the sequence of steps terminates in the terminating step, determining the length of a line segment connecting a starting point of the sequence of steps to an end point of the terminating step, said line segment length corresponding to the arc length; and
   producing an image in accordance with said rasterized image description, said image including characteristics that are derived from said arc length determination.

2. The method according to claim 1, wherein said producing step comprises the step of displaying said image.

3. The method according to claim 1, wherein said producing step comprises the step of printing said image on a substrate.

4. The method according to claim 1, wherein said line segment length is determined by accumulating the length of the sequence of steps and adding a correction amount to said accumulated length, said correction amount corresponding to the contribution of said terminating step.

5. The method according to claim 4, wherein said one direction is one of a horizontal direction and a vertical direction and said another direction is a diagonal direction.

6. The method according to claim 5, wherein said correction amount is:

$$\sqrt{(N+1)^2 + 1} - N;$$

where N is the number of the sequence of steps in said one of the horizontal and vertical directions.

7. The method according to claim 4, wherein said one direction is a diagonal direction and said another direction is one of a horizontal direction and a vertical direction.

8. The method according to claim 7, wherein said correction amount is:

$$\sqrt{(N+1)^2 + N^2} - N\sqrt{2};$$

wherein N is the number of the sequence of steps in said diagonal direction.

9. The method according to claim 4, wherein the step of determining arc length further comprises:
   storing a plurality of correction amounts, each correction amount corresponding to one of a plurality of step sequences; and
   selecting an appropriate correction amount in accordance with the sequence of steps of movement in said one direction.

10. The method according to claim 4, wherein the step of determining arc length further comprises:
    repeating said determining steps until movement is achieved along the entire curve on the pixel grid; and
    summing the length of the line segment lengths to determine the total arc length.

11. The method according to claim 1, wherein the step of determining arc length further comprises:
    storing a plurality of line segment lengths, each line segment length corresponding to one of a plurality of step sequences; and
    selecting an appropriate line segment length in accordance with the sequence of steps of movement in said one direction.

12. The method according to claim 1, wherein the step of determining arc length further comprises:
    repeating said steps until movement is achieved along the entire curve on the pixel grid; and
    summing the length of the line segment lengths to determine the total arc length.

13. An imaging system, comprising:
    means for interpreting a page description language;
    a rasterizer, said rasterizer comprising means for determining arc length of a curve, said arc length determining means comprising:
       means for determining a sequence of steps of movement along the curve on a pixel grid in one of several predetermined directions;
       means for determining whether the sequence of steps terminates in a terminating step along the curve in another of said predetermined directions, said another direction neighboring said one direction; and
       means for determining the length of a line segment connecting a starting point of the sequence of steps to an end point of the terminating step if the sequence of steps terminates in the terminating step, said line segment length corresponding to the arc length; and
    means for producing an image in accordance with said rasterized image description, said image including characteristics that are derived from said arc length determination.

* * * * *